G. W. DUBUISSON.
Harrow.
No. 39,132.  Patented July 7, 1863.
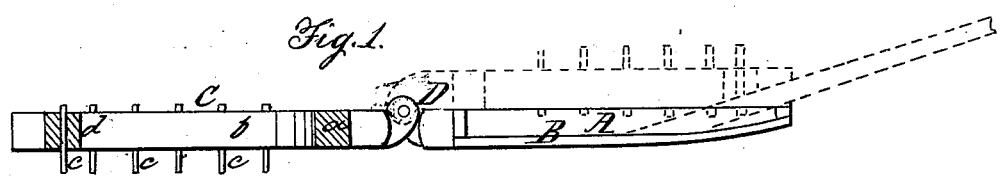
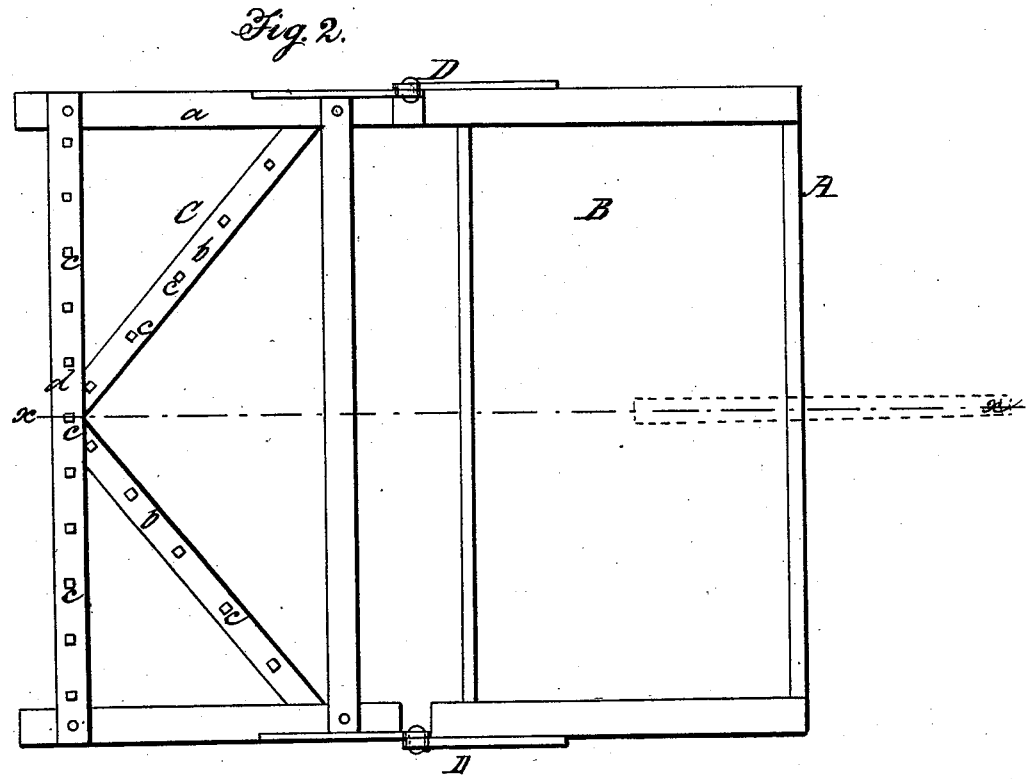
Witnesses:
J. W. Coombs
Rob't H. Lowden
Inventor:
Geo. W. Dubuisson
per Munn & Co.
Attorneys.

UNITED STATES PATENT OFFICE.

GEORGE W. DUBUISSON, OF JERUSALEM SOUTH, NEW YORK.

IMPROVED CLOD-CRUSHER AND HARROW.

Specification forming part of Letters Patent No. 39,132, dated July 7, 1863.

*To all whom it may concern:*

Be it known that I, GEORGE W. DUBUISSON, of Jerusalem South, in the county of Queens and State of New York, have invented a new and useful Agricultural Implement or Device, the same being a Combined Harrow and Clod-Crusher; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the several figures.

The object of this invention is to obtain an implement or device of simple construction which will effectually crush and pulverize clods of earth and at the same time harrow the earth, so as to render it friable and permeable to air and moisture.

To enable those skilled in the art to fully understand and construct my invention, I will proceed to describe it.

A represents the clod-crusher, which is formed of a square or rectangular frame, having a bottom, B, attached to it, the front part of which is slightly inclined upward, as shown in Fig. 1. This bottom may be formed of metal or planks, or planks shod with metal. The frame of the crusher may be of wood, and it has a draft-pole attached centrally to it, as shown in red.

To the back end of the clod-crusher A a harrow, C, is attached. This harrow is formed of a rectangular frame, $a$, having two diagonal bars, $b$, within it, as shown clearly in Fig. 2. The two diagonal bars $b\ b$ are provided with teeth $c$, as well as the back bar, $d$, of the frame $a$. The teeth $c$ of the bars $b\ b$ are in line with the centers of the spaces between the teeth $c$ of the bar $d$.

The harrow C is attached to the clod-crusher A by means of hinges or joints D D, so constructed as to admit of the harrow being turned over on the clod-crusher, as shown in red in Fig. 1. The harrow is turned over on the clod-crusher when the device is being drawn from place to place, and also when the clods are required to be crushed without having the ground harrowed. When P, the hammer, is in use, it may be readily raised by the hand in order to free it from weeds and trash.

In case the clod-crusher A requires to be loaded, in order to give it additional weight, stones may be placed on the clod-crusher. The device as a whole is extremely simple and efficient, and may be constructed at a small cost.

Having thus described my invention, what I claim as new, and desire to secure by Letters Patent, is—

The combination of the clod-crusher A and harrow C, connected by hinges or joints D, and arranged substantially as herein shown and described.

GEO. W. DUBUISSON.

Witnesses:
GEO. DAYTON,
H. A. T. GRANBERY.